UNITED STATES PATENT OFFICE.

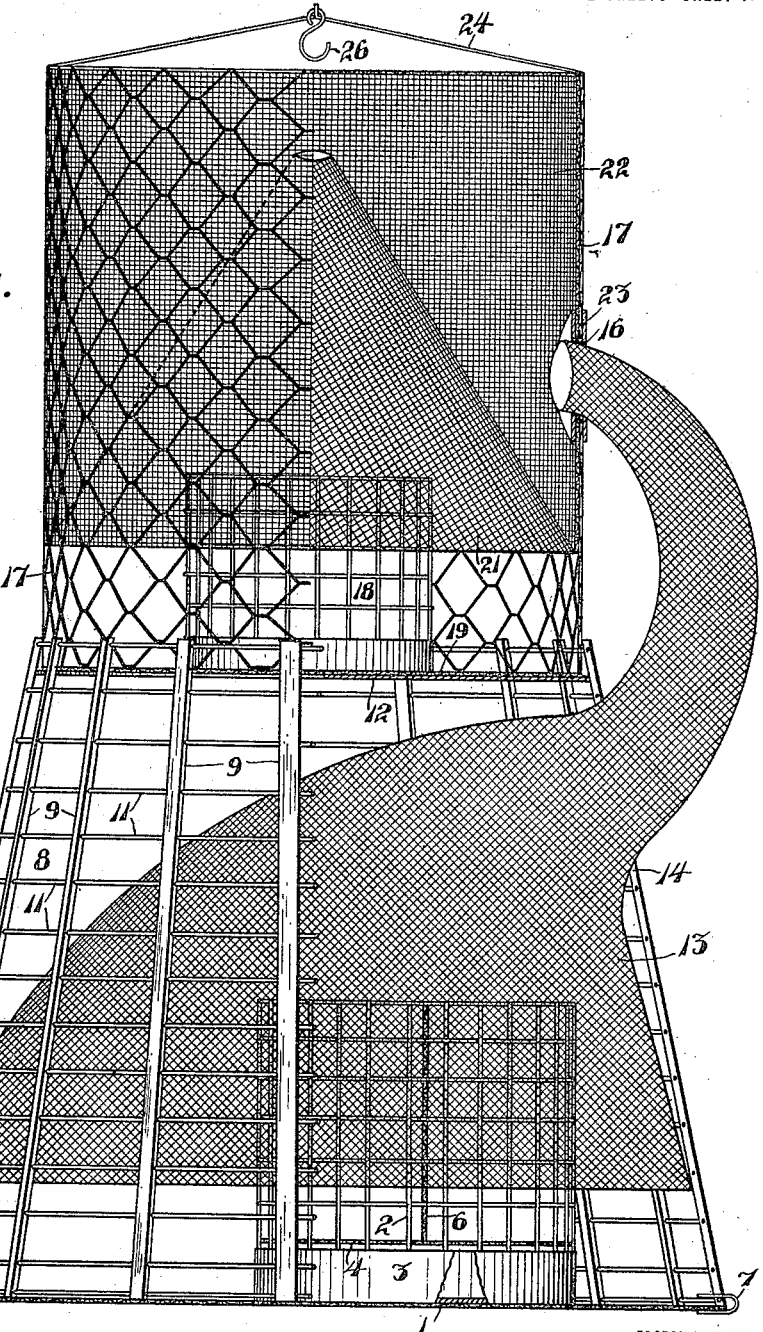

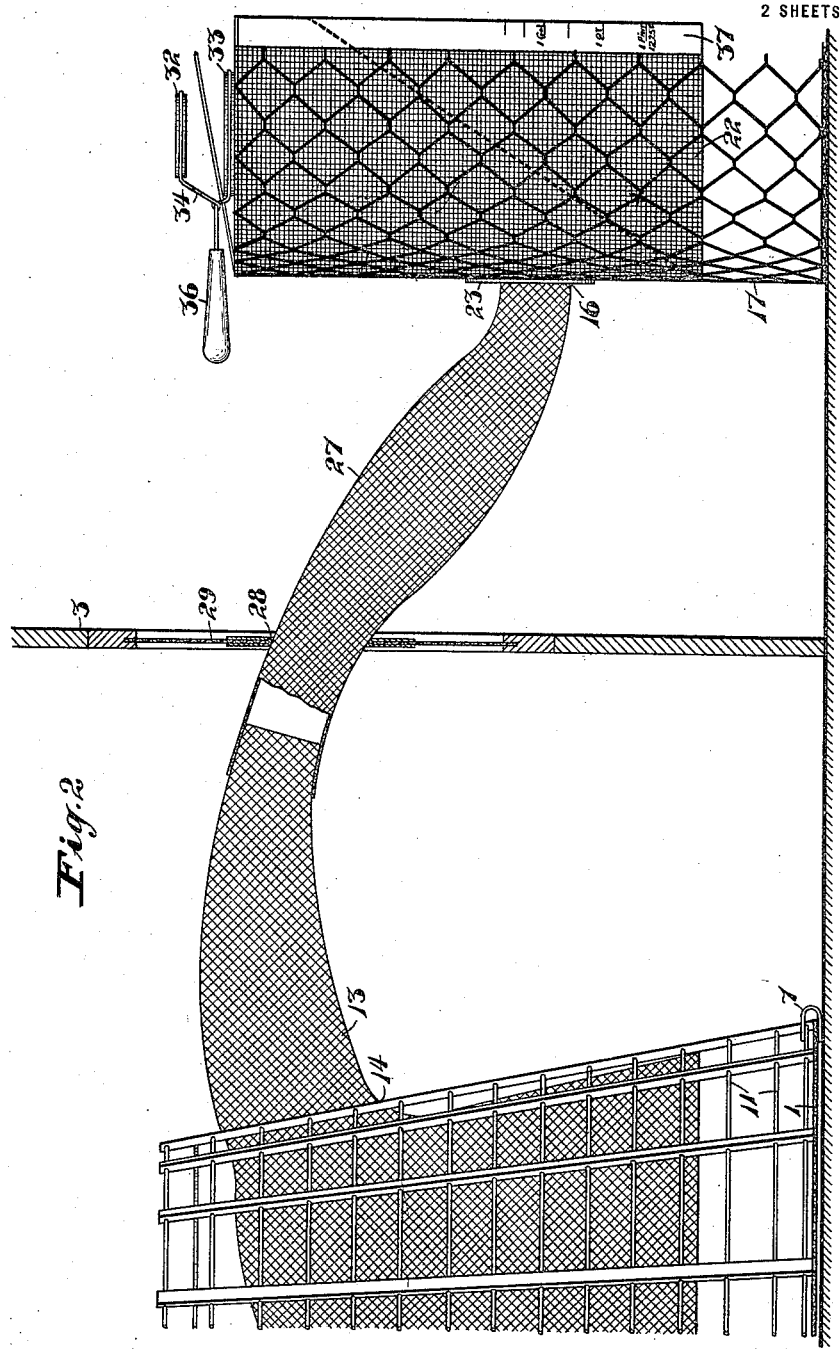

LOUIS JACOBS, OF SAN FRANCISCO, CALIFORNIA.

FLY-TRAP.

1,172,211.     Specification of Letters Patent.     Patented Feb. 15, 1916.

Application filed February 4, 1915. Serial No. 6,156.

*To all whom it may concern:*

Be it known that I, LOUIS JACOBS, a citizen of the United States, residing at San Francisco, in the county of San Francisco and State of California, have invented new and useful Improvements in Fly-Traps, of which the following is a specification.

The present invention relates to improvements in fly traps.

One object of the invention is to provide a fly trap having a base to which access can be had from all sides and at any angle, also one having an upper frame supported upon a lower frame, and having a trap therein, both traps leading to the same retaining chamber for the flies; also one in which the two frames can be used separately if desired.

A further object of the invention is to provide a fly trap which can be placed in a room and which will clear the room of flies and conduct them to the outside of the room.

A further object is to provide one in which the flies so conducted will be retained in a retaining chamber outside of the room.

A further object is to provide an improved device for killing flies, especially those which have been trapped and are in the retaining chamber.

A further object is to provide a register for indicating the number of flies in a given space.

My invention also consists in the novel arrangement of parts hereinafter fully specified and particularly pointed out in the claim.

In the accompanying drawings, Figure 1 is a broken side view of my improved trap showing the same in one position of its use; Fig. 2 is a similar view of the same in another position.

Referring to the drawing, 1 indicates a circular base of woven wire of large mesh upon the central portion of which is supported a cylindrical bait holder 2, also formed of woven wire of large mesh, having in its bottom a pan 3 to receive liquid bait. Across the bait holder immediately above said pan is a horizontal partition 4, also formed of large woven wire mesh and extending vertically above said horizontal partition to the top of the bait holder is a vertical partition 6, formed of the same material as the horizontal partition, and dividing the holder into two compartments, one for dry bait and the other for wet bait.

Surrounding the bait holder, and removably secured to the edge of the base by clips 7 or otherwise, is a frustoconical frame 8, formed of upwardly extending members 9, and horizontal uniformly spaced circular wire rings 11 secured to the vertical members 8. Closing the top of the frame is a sheet metal top 12.

Within the frame is a lower trap 13 formed of fine woven wire mesh, the lower edge of which is secured to the frame at about half-way of the height of the bait holder, said trap tapering upwardly. The wire of which said trap is formed is so fine that it can be readily bent, and the upper portion of the trap is bent and extends through a hole 14 in the side of the frame 8 at the top and then bent so that it extends inwardly through a hole 16 in a side of an upper frame 17. Said upper frame 17 is of a general cylindrical form and of a diameter to enable the lower end thereof to be received, and fit snugly, in the top of the lower frame. Said upper frame is made of woven wire of large mesh. It surrounds a bait holder 18 of less size than, but similar in form to, the lower bait holder 2, said bait holder 18 being laid upon a base 19 of woven wire of large mesh, resting upon the top 12 of the lower frame. Secured to the side of the upper frame below the level of the top of the bait holder 18 is a trap 21 of fine flexible woven wire mesh the open bottom of which is of the same diameter as the upper frame, and is secured thereto around the entire periphery, said trap 21 tapering upwardly to a small hole at the top, through which the flies can escape into the upper portion of the upper frame, said upper portion above the juncture of the trap with the cylindrical surface of the upper frame having a lining 22 of fine woven wire mesh, the top of the upper frame being formed of the latter material.

It will now be understood that into the chamber within the upper portion of the upper frame and outside of the upper trap 21, all the flies attracted by the bait in the two bait holders will eventually find their way, either by the upper trap through the small opening at the top thereof or by the lower trap, the upper end of which leads through the hole 16 in the upper trap and conducts directly into said chamber. The edge of this hole 16 is bound with thin sheet metal, as shown at 23, bent around the same. A handle 24 is attached to the top of the upper frame, and to said handle is secured a hook 26 by which the upper frame may be suspended from a ceiling, its base being secured to the frame by clips, or the whole device consisting of both frames may be so secured to said ceiling, the two frames being secured together by clips.

It will readily be seen that the device can be used either single or double, that is, with both frames connected, or using the upper frame alone.

When the lower frame alone is used, the upper end of the trap, extending through a side of the frame, may also extend through a side of a wall of a room, or the hole in a window, so that the trap serves to eject all of the flies to the outside of the room, and no flies are seen inside the trap.

Another method in which the apparatus may be used is specifically illustrated in Fig. 2. In this mode of use of the invention, there is provided an extra tube or extension 27 of wire cloth of fine mesh, into one end of which the upper end of a trap is inserted, the extension passing through a hole 28 in wire cloth 29 secured to the edge of a hole in a partition 3, the edge of said hole in the wire cloth being suitably bound with sheet metal, and the other end of said extension leading through the hole 16 in the upper frame. The lower frame 8 is placed in a room and the upper frame outside the room, so that the flies caught in the trap in the inner frame find their way by means of the extension into the trap in the outer frame so that no flies appear in the inner frame. This is an important matter when the trap is used for clearing a restaurant of flies, since the sight of flies, even although caught in a trap, is disagreeable to many people, when eating. In this way, although the flies are removed from the restaurant, yet no flies appear in the trap within the restaurant, but all of them are caught outside the restaurant. When the upper frame alone is used a suitable shutter is employed to close the hole 16 therein.

For the purpose of killing the flies in the trap, I provide a device having upper and lower pans 32, 33, supported by wires 34 and connected to a handle 36. The upper pan is inserted in a fire until it becomes red hot, and is then taken out of the fire and the lower pan is laid upon the top of the upper trap, and fifteen drops of carbolic acid are dropped upon the upper pan. The fumes given off during the night by the carbolic acid kill the flies not only in the trap, but also in the room, if there are any.

The lower pan protects any article upon which it is laid catching fire from the upper pan.

I also provide a register 37 to indicate the number of flies to a pint, quart, gallon or the like.

The trap itself is made entirely of wire, no sheet metal being used, except for the top of the lower frame. It is therefore perfectly ventilated and easily fumigated.

I claim:—

The combination of a frame having a metal top, a bait holder therewithin, a trap in the frame formed of fine woven wire mesh and tapering upwardly, the upper portion of the trap extending through a hole in the side of the frame, an upper frame supported upon the top of the lower frame, a bait holder within said upper frame, a trap of fine wire mesh in said upper frame, said trap tapering upwardly to a small hole in the top, the upper portion of the upper frame, above the juncture of the trap therein with the surface of the upper frame, having a lining of fine woven wire mesh, said lining having an aperture therethrough, the tapering upper end of the lower trap removably communicating with said aperture.

In testimony whereof I have hereunto set my hand in the presence of two subscribing witnesses.

LOUIS JACOBS.

Witnesses:
F. M. WRIGHT,
D. B. RICHARDS.

Copies of this patent may be obtained for five cents each, by addressing the "Commissioner of Patents, Washington, D. C."